US008176061B2

(12) United States Patent
Swanbeck et al.

(10) Patent No.: US 8,176,061 B2
(45) Date of Patent: May 8, 2012

(54) TRACKING DIGITAL ASSETS ON A DISTRIBUTED NETWORK

(75) Inventors: Wendy Swanbeck, North Chelmsford, MA (US); James O. Schreckengast, Fort Collins, CO (US); Charles E. Parry, Andover, MA (US); Anne C. Rourke, Lynnfield, MA (US)

(73) Assignee: Eastman Kodak Company, Rochester, NY (US)

( * ) Notice: Subject to any disclaimer, the term of this patent is extended or adjusted under 35 U.S.C. 154(b) by 384 days.

(21) Appl. No.: 12/608,250

(22) Filed: Oct. 29, 2009

(65) Prior Publication Data

US 2011/0106826 A1    May 5, 2011

(51) Int. Cl.
*G06F 17/30*    (2006.01)
*G06F 7/00*    (2006.01)

(52) U.S. Cl. .......................... 707/755; 707/758; 707/610
(58) Field of Classification Search .................... 707/610
See application file for complete search history.

(56) References Cited

U.S. PATENT DOCUMENTS

| 5,999,722 | A | 12/1999 | Ketterer et al. |
| 6,370,545 | B1 | 4/2002 | Shaath |
| 7,359,955 | B2 | 4/2008 | Menon et al. |
| 7,415,451 | B2 * | 8/2008 | Kim et al. ............................ 1/1 |
| 7,451,224 | B1 | 11/2008 | Stamler |
| 7,539,783 | B2 | 5/2009 | Kochunni et al. |
| 7,562,149 | B2 | 7/2009 | Teodosiu et al. |
| 7,567,812 | B2 | 7/2009 | Herrod et al. |
| 7,783,596 | B2 * | 8/2010 | Smolen et al. ................. 707/609 |
| 2005/0131871 | A1 * | 6/2005 | Howard et al. .................... 707/3 |
| 2006/0101064 | A1 * | 5/2006 | Strong et al. ................... 707/102 |
| 2008/0178198 | A1 | 7/2008 | Gauba |
| 2009/0219392 | A1 * | 9/2009 | Roskowski ................... 348/143 |
| 2010/0228784 | A1 * | 9/2010 | Beaman et al. ............... 707/802 |

OTHER PUBLICATIONS

"Bit( Parity for Device control" brochure from Bit9, Inc., 266 Second Ave., Waltham, MA 02451.

* cited by examiner

*Primary Examiner* — Kuen Lu
(74) *Attorney, Agent, or Firm* — Kevin E. Spaulding

(57) ABSTRACT

A method for tracking digital assets stored on digital asset storage media including detecting availability of a reference asset storage medium containing digital assets at a first time; determining a reference medium identifier and digital asset identifiers; storing renditions of the digital assets in a cached storage area; and storing an association between the reference asset storage medium the reference medium identifier, the digital asset identifiers and the renditions of the digital assets in a database in a persistent storage area. The method further includes, at a second later time, detecting the availability of a candidate asset storage medium, determining a candidate medium identifier that uniquely identifies the candidate asset storage medium, and comparing the candidate medium identifier to the reference medium identifier to determine whether the candidate asset storage medium is the same as the reference asset storage medium.

23 Claims, 3 Drawing Sheets

TRACKING DIGITAL ASSETS ON A DISTRIBUTED NETWORK

CROSS-REFERENCE TO RELATED APPLICATIONS

Reference is made to commonly assigned, co-pending U.S. patent application Ser. No. 12/362,762, filed Jan. 30, 2009 entitled: "System for Managing Distributed Assets and Metadata", by L. Blomstedt, et al, which is incorporated herein by reference.

FIELD OF THE INVENTION

The present invention relates to the tracking of digital assets, and more particularly to the tracking digital assets stored on a distributed network.

BACKGROUND OF THE INVENTION

Digital assets include digital files of all types such as photo, video, audio, text, and rich text. In addition, digital assets can include composite aggregations of other digital assets such as html pages and their image attachments. Digital assets can exist in many forms and can reside on many different types of asset storage media.

Digital asset storage media can include local and remote storage devices and services. Some digital asset storage media are read-only storage media such as CD-ROM optical disks. Other digital asset storage media are read-write storage media such as removable and fixed hard drives, floppy disks, flash drives and other solid state storage devices, and read-write optical disks. Other types of devices such as digital cameras, video cameras, electronic picture frames, mobile phone and digital audio storage devices can also serve as digital asset storage media. Other forms of digital asset storage media would include remotely accessible storage media such as network connected servers, network accessible storage devices (NAS), internet locations with remotely accessible calling interfaces, and so-called "cloud" storage areas, such as services provided by Amazon and Google.

Owners of digital assets may wish to enumerate and track where their digital assets are located so they can access, update and manage them. In U.S. Pat. No. 5,999,722, Ketterer et al. describe a method of cataloging digital assets stored on removable media on a computer which includes the optional step of storing a unique media ID on the removable media. In U.S. Pat. No. 6,370,545, Shaath teaches a method of accessing digital assets stored on removable storage media which includes creating a unique identifier for the storage media. Both of these methods address the need for tracking digital assets available on a single computer, and do not address the case where digital assets are stored and accessed on a variety of nodes in a distributed network.

Problems often arise when a user's digital assets reside on a digital asset storage media that apparently moves around on a distributed network. For example, a CD containing digital photographs can be accessed from one computer on a distributed network, and then the CD can be removed from the first computer and accessed from a second computer on the distributed network. Tracking the storage location of digital assets when their apparent location has changed is difficult. Without the capability to track the digital assets, software that attempts to track them will see the first set of digital assets appear to "go away" and a new set of digital assets appear in some other location, when in fact they are actually the same set of digital assets.

When this happens, the digital asset tracking software generally assumes that the first set of digital assets is either offline (unreachable) or has been deleted, and that the second instance is a new set of digital assets. Even if it was able to determine that the second instance of the digital assets had the same content as the first, it still would not be able to distinguish whether these were the same digital assets or copies of them.

The problem commonly occurs when the digital assets exist on removable digital asset storage media such as a CD, DVD or thumb drive. In this case, the digital asset storage media can be removed from one computer and then attached to a different computer.

The problem can also occur on the internet when a service is accessed via a different network address, or when the same digital assets are accessed from one service through to another. In addition, the problem can arise if different networking types are involved, which can occur if a service or network attached storage device supports multiple network connections or protocols. For example, it is difficult to recognize that the same digital asset storage medium that was previously accessed by UPnP is now accessible over a USB cable or via HTTP.

In order to access any digital asset storage medium, a set of hardware, software and security protocols are necessary. Together, they comprise the method for accessing stored assets. When a digital asset storage medium is moved or its connection or communication protocol changes, it affects its method for accessing stored assets.

The key is that the user doesn't want to worry about the method for accessing stored assets when tracking their digital assets. Existing solutions are generally incapable of successfully tracking digital assets because the method for accessing the stored digital assets is tied to a representation of the digital asset, so moving or changing the way a digital asset storage medium is connected to the network confuses the software that attempts to track the digital assets.

Certain types of storage media, such as the USB drives that have been popular in recent years, include an identifier (e.g., a serial number) that can be used to uniquely identify the storage medium. However, even if a particular system may use the unique identifier to recognize that the storage medium has been accessed before on that system, there is no provision for tracking digital assets on a distributed network. An additional problem exists the USB drive is not always accessible using applications that do not have administrative privileges Bit9, Inc. of Waltham, Mass. has disclosed a software application known as Bit9 Parity that enables a company to control access to removable media such as USB drives for data security reasons. This application enables the definition of a list of authorized removable media devices, as well as allowable access modes for those devices. While this approach addresses the problem of controlling access to a predefined set of assets, it does not provide any mechanism for tracking a user's assets in a distributed system of interconnected network nodes, where it will not be possible to predefine a set of asset storage media.

U.S. Pat. No. 7,451,224 describes a table-driven application for updating device identifiers and communicating a message with the updated identifiers to other nodes in a distributed network.

U.S. Pat. No. 7,562,149 discloses a method for locating resources in a peer-to-peer network. The method relies on cooperative network nodes registering themselves with a resource naming server to provide access information such as an IP address.

U.S. Patent Application Publication No. 2008/0178198 to Gauba discloses a distributed digital media management system for the discovery, management, access and control of digital media distributed over a plurality of devices. This approach does not preserve access to the digital media when the devices are no longer available, or are only intermittently available.

Accordingly, there remains a need to overcome the problem of tracking digital asset storage media, and the digital assets that they contain that is robust for the digital asset storage media going offline and returning online, sometimes in a different virtual location on the network from where they were last seen.

SUMMARY OF THE INVENTION

The aforementioned need is met by a method for tracking digital assets stored on digital asset storage media comprising:

detecting availability of a reference asset storage medium at a first time;

determining a reference medium identifier that uniquely identifies the reference asset storage medium;

storing an association between the reference medium identifier and the reference asset storage medium in a database in a persistent storage area accessible from a plurality of network nodes on a distributed network;

enumerating digital assets stored on the reference asset storage medium;

storing renditions of the enumerated digital assets in a cached storage area accessible from the plurality of distributed network nodes to preserve access to the enumerated digital assets even when the reference asset storage medium is not connected to the distributed network;

determining digital asset identifiers that uniquely identify each of the enumerated digital assets;

storing an association between the digital asset identifiers, the reference medium identifier and the renditions of the digital assets in the database on the persistent storage area;

at a second later time, detecting the availability of a candidate asset storage medium; determining a candidate medium identifier that uniquely identifies the candidate asset storage medium; and comparing the candidate medium identifier to the reference medium identifier stored in the database in the persistent storage area to determine whether the candidate asset storage medium is the same as the reference asset storage medium.

The present invention has the advantage that it utilizes a medium identifier that is specific to the digital asset storage medium itself, and is completely independent of its location, network connectivity or communications protocol used to access it.

The present invention has the additional advantage that it enables a view of the owner's digital assets independent of location and communications protocol required to read and write data to the asset storage medium.

It has the additional advantage that it avoids the creation of duplicate entries for the same digital asset if a digital storage medium is accessed from different locations.

DETAILED DESCRIPTION OF THE INVENTION

The invention described herein is a set of methods for tracking digital assets stored on digital asset storage media in a general way that can handle the case when the asset storage media are moved to different locations or are detected under varying network protocols and addressing schemes.

Figure 1:
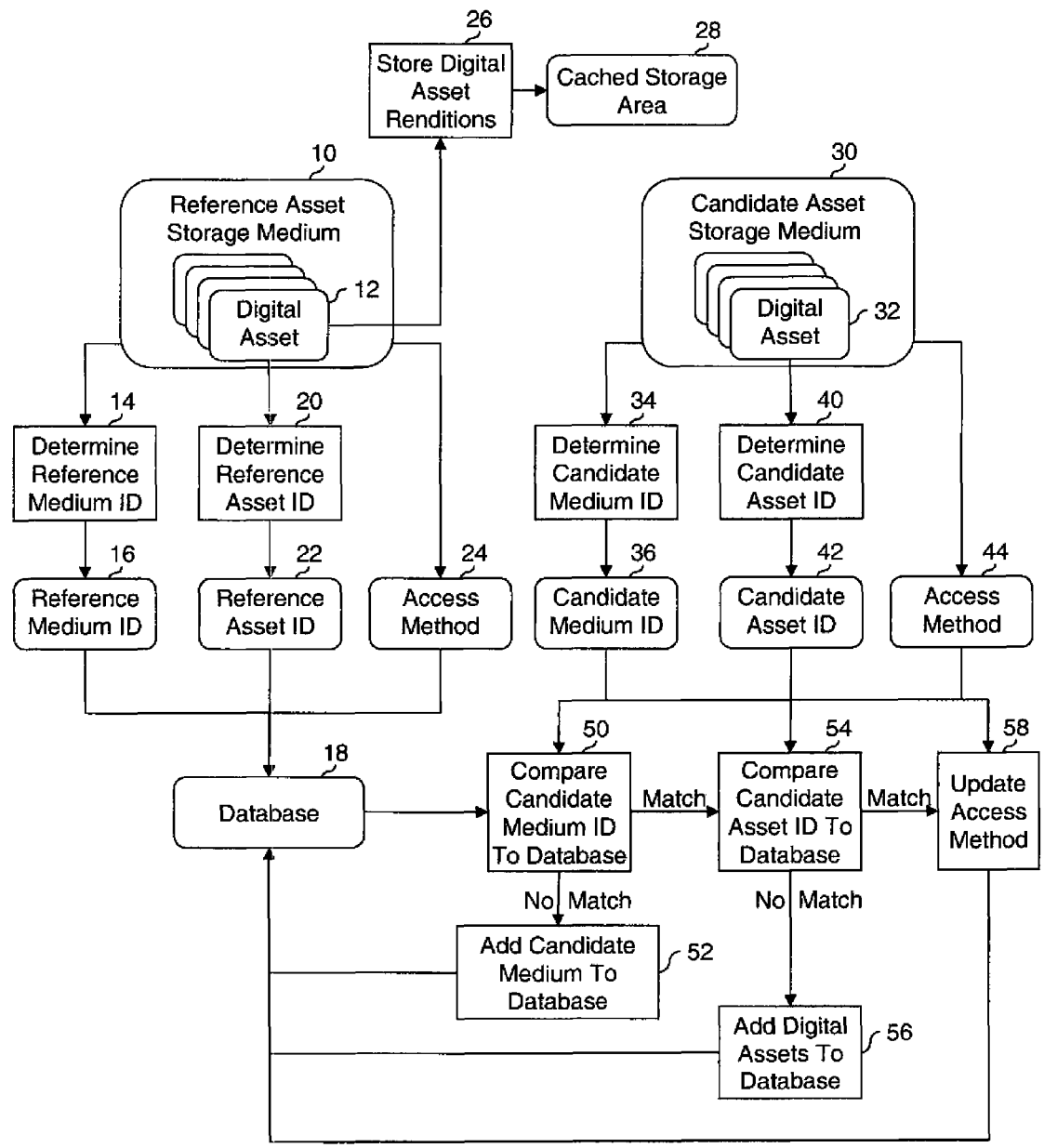
FIG. 1 is a flow chart illustrating an embodiment of the present invention.

FIG. 1 shows a high-level flow diagram illustrating an asset tracking system according to a preferred embodiment of the present invention. At some first time, a digital asset tracking system detects that a reference asset storage medium 10 containing one or more digital assets 12 is available for accessing. A determine reference medium ID step 14 is used to determine a reference medium identifier 16 that uniquely identifies the reference asset storage medium. A preferred method for calculating the reference medium identifier 16 will be described in detail below. The reference medium identifier 16 is associated with the reference asset storage medium 10 and is stored in a database 18. The database 18 is stored in a persistent storage area that is accessible from a plurality of network nodes on a distributed network.

The digital assets 12 stored on the reference asset storage medium 10 are enumerated, and a determine reference asset identifier step 20 is used to determine a reference asset identifier 22 for each of the enumerated digital assets 12. The reference asset identifier 22 uniquely identifies the corresponding digital asset 12. An association between the digital asset identifiers 22 and the reference medium identifier 16 is then stored in the database 18 on the persistent storage medium.

Preferably, information about an access method 24 for the digital assets 12 on the reference asset storage medium 10 is also stored in the database 18. As appropriate, the information about the access method 24 can include information about a network location for the reference asset storage medium, information about communications protocols or information about calling interfaces required to communicate with the reference asset storage medium.

Additionally, a store digital asset renditions step 26 is used to store renditions of the digital assets 12 in a cached storage area 28 accessible from the network nodes on the distributed network so as to preserve access to the digital assets even when the reference asset storage medium 10 is not connected to the distributed network. The cached storage area 28 can be stored in the same location as the persistent storage area that was used to store the database 18, or alternately can be stored in a different storage location.

The renditions of the digital assets 12 can be copies of the digital assets 12. Alternately, they can be low-resolution images (e.g., thumbnail images) that are formed from the digital assets 12. For the case where a digital asset is a digital video, the rendition of the digital asset 12 can be a shortened, or more highly compressed video clip, or can be a series of key frames sample from the digital video. For the case where the rendition of the digital asset 12 is large (e.g., a lengthy digital video file), the rendition of the digital asset 12 can be partitioned into segments and distributed into multiple cached storage areas 28.

For cases where the digital assets 12, or duplicate copies thereof, are already stored in highly-available storage areas such as network servers or internet websites, those storage areas can be detected and used as the cached storage area in lieu of storing additional renditions of the digital assets. For cases where the reference asset storage medium 10 is only intermittently available (e.g., removable media), renditions of the digital assets 12 can be stored in a highly-available storage area that is generally accessible across the distributed network. An example of a highly-available storage area that could be used for the cached storage area 28 would be a central storage area such as a server or an internet website. The cached storage area 28 can also be a storage area on an edge node on the distributed network.

At some second time, it is detected that a new candidate asset storage medium 30 containing one or more digital assets 32 is available for accessing. Initially, it is unknown whether the candidate asset storage medium 30 corresponds to an asset storage medium that has already been added to the database 18. To determine whether the candidate asset storage medium 30 is a known asset storage medium, a determine candidate medium identifier step 34 is used to determine a unique candidate medium identifier 36. Additionally, a determine candidate asset identifier step 40 is used to determine candidate asset identifiers 42 for each of the digital assets 32.

A compare candidate medium identifier to database step 50 is then used to compare the candidate medium identifier 36 to the reference medium identifier 16 for the reference asset storage media 10 that have been added to the database 18. If no match is found, it can be concluded that the candidate asset storage medium 30 is different than all of the known asset storage media. In that case, an add candidate medium to database step 52 can be used to update the database 18 by storing an association between the candidate asset storage medium 30, the candidate medium identifier 36, the associated candidate asset identifiers 42 and information about the access method 44.

If it is determined that the candidate medium identifier 36 matches a reference medium identifier 22 for a reference asset storage medium 10 in the database 18, a compare candidate asset identifier to database step 54 can be used to compare the candidate asset identifiers 42 for the digital assets 32 to the reference asset identifiers 22 for the digital assets 12 on the reference asset storage medium 10. An add digital assets to database step 56 can be used to add information about any digital assets 32 that do not match known digital assets 12 associated with the reference asset storage medium 10 to the database 18. The information added to the database would include an association between the candidate asset storage medium 30 and the candidate asset identifier 42, together with information about an access method 44 for the digital assets. If the candidate asset identifier 42 does match a known digital asset, an update access method step 58 can be used to store updated information about the access method 44 if it differs from the access method stored in the database.

Additional details pertaining to the present invention will now be discussed. The digital asset tracking system uses a database 18 is used to store information about digital assets in a persistent storage area accessible from a plurality of interconnected network nodes. When the digital asset tracking system detects a new digital asset storage medium, a record identifying the digital asset storage medium is added to the database 18. The database 18 contains information about the digital asset storage media as well as information about the digital assets themselves.

Figure 2A:
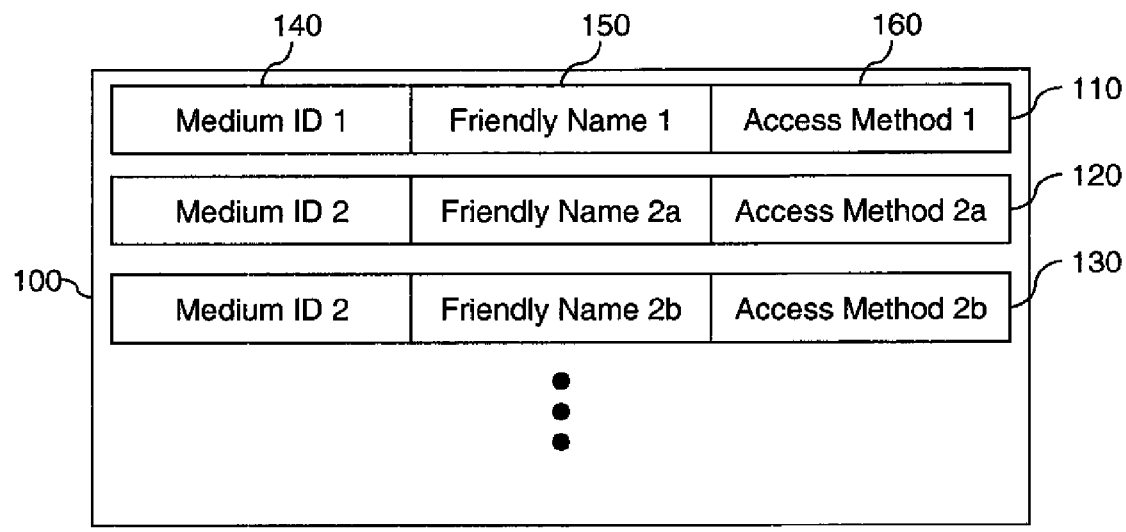
FIG. 2A shows an example data structure for a digital asset storage medium database; database.

FIG. 2A shows an example of a digital asset storage medium database 100 that can be used to store digital asset storage medium records as part the database 18 (FIG. 1). The digital asset storage medium database 100 contains a collection of digital asset storage medium records. In this example, three digital asset storage medium records 110, 120 and 130 are shown. Each of the digital asset storage medium records 110, 120 and 130 is made up of a set of fields. Medium identifier field 140 stores a unique identifier that is determined for each digital asset storage medium. Friendly name field 150 stores a label associated with the digital asset storage medium (such as "Kodak Gallery", or "Holiday CD"). Access method field 160 stores information about the method for accessing digital assets stored on the digital asset storage medium. It will be obvious to one skilled in the art that additional fields can also be stored with each digital asset storage medium record. For example, in some implementations it may be desirable to store an online/offline status field or a latest access date field in each digital asset storage medium record.

As illustrated in FIG. 2A, it may be possible to have more than one way of accessing the same digital asset storage medium. In this example, Medium ID 2 has two different ways to access it and is referred to by two different friendly names. An example of this situation is a shared network disk drive. One path to it might allow read-write access, while another path might only allow read-only access. The digital asset tracking system might find the same digital asset storage medium through one or another share name or with different credentials and may not have a way to detect that they are in fact two views of the same digital asset storage medium. Without additional information, they would appear to be two separate digital asset storage media, containing some duplicate digital assets.

Once an asset storage area has been detected and the digital asset storage medium record calculated, digital assets stored on the digital asset storage medium can be enumerated and tracked. The digital assets on the digital asset storage medium can be identified by searching through any folders and subfolders on the digital asset storage medium.

Figure 2B:
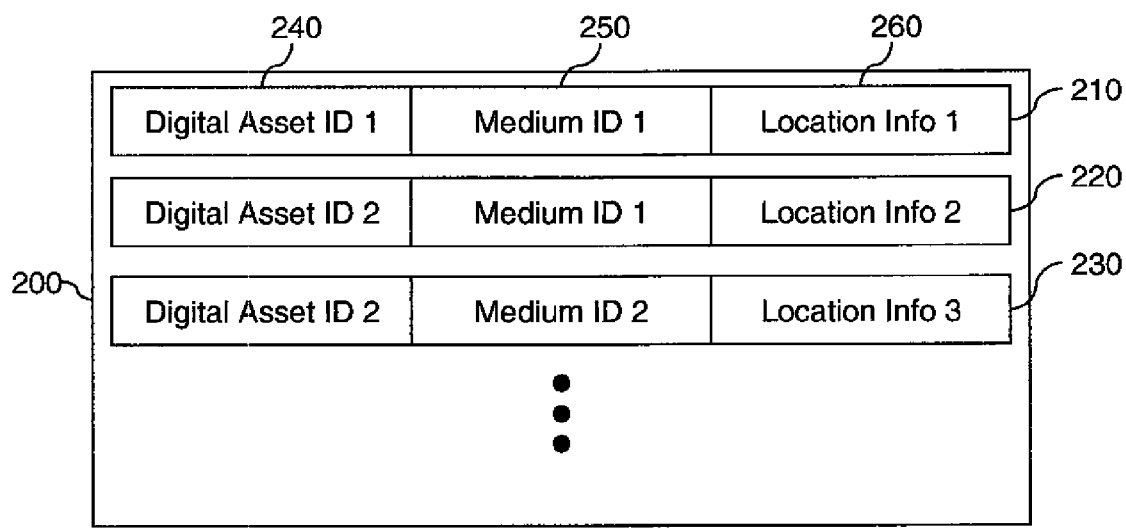

FIG. 2B shows an example of a digital asset database 200 that can be used to store digital asset records as part the database 18 (FIG. 1). The digital asset database 200 contains a collection of digital asset records. In this example, three digital asset records 210, 220 and 230 are shown. Each of the digital asset records 210, 220 and 230 is made up of a set of fields. Digital asset identifier field 240 stores a unique identifier that is determined for each of the enumerated digital assets.

Medium identifier field 250 is used to associate the digital asset with the digital asset storage medium on which it is stored. The medium identifier stored in the medium identifier field 250 is the same medium identifier that is stored in the medium identifier field in the Digital asset storage medium database 100 (FIG. 2A). In the example of FIG. 2B, two of the digital asset records 210 and 220 have the same medium identifier (Medium ID 1) indicating that they are both stored on the same digital asset storage medium. The third digital asset record 230 has a different medium identifier indicating that it is stored on a different digital asset storage medium.

Location information field 260 stores information about the location of the file and folder/subfolder where the digital asset is stored. A second location information field 260 can also be used to store information about the location that the rendition of the digital asset that was stored in the store digital asset renditions step 26. It will be obvious to one skilled in the art that additional fields can also be stored with each digital asset record. For example, a thumbnail image field can be used to store a thumbnail image if appropriate to the type of digital asset.

The database 18 (FIG. 1) stored in the persistent storage area comprises both the digital asset storage medium database 100 (FIG. 2A) and the digital asset database 200 (FIG. 2B). It will be recognized by one skilled in the art that there are many ways that these databases can be configured. The digital asset storage medium database 100 and the digital asset database 200 can be parts of a single larger database file, or alternately, they can be independent database files.

The persistent storage area isn't limited to a single physical storage location or database. It may also consist of a plurality of storage locations with the database information distributed in a way that can be synchronized between them. Using this distributed storage mechanism, one component in one location may store tracking information in their local copy of the persistent storage location, then at a later time it can synchronize (copy) the tracking information to the plurality of storage locations. Another component in another location can then retrieve a copy of the tracking information and use it to locate digital assets.

The persistent storage area used to store the database 18 (FIG. 1) can be located on a local computer hard drive or other device that is connected to a distributed network, or it can reside on a network server location that is accessible from a plurality of interconnected network nodes. In this way, the digital asset tracking system is designed so that one component can store tracking information in the database 18 in a persistent storage area on a network server, and a different component can retrieve the information and use it for tracking. For example, the reference asset storage medium 10 may be accessed at a first time on a first network node of the distributed network, and the candidate asset storage medium 30 may be accessed at a second time on a second network node of the distributed network. In order to determine whether these two digital asset storage media are the same, both of the network nodes must have access to the database 18 stored in the persistent storage area.

Different applications can present the tracked digital assets to the user in a variety of ways as is well-known in the digital asset organization art. If a user selects a digital asset for use, it can be retrieved for them by the following steps:

Using the digital asset identifier, retrieve the information in the corresponding digital asset record from the digital asset database 200. This includes the medium identifier stored in the medium identifier field 250 and the location information from the location information field 260.

Use the medium identifier to retrieve one or more corresponding digital asset storage medium records. If there is more than one record for that particular medium identifier, it means that it's been detected using more than one access method. Additional processing can be used to determine which access method should be used to access the chosen digital asset. The details of this additional processing are outside the scope of this document. For the purposes of this description, it will be assumed that one digital asset storage medium record with a corresponding access method has been selected.

Retrieve the access method from the access method field of the digital asset storage medium record. The access method includes all the information the system will need to retrieve the digital asset from the digital asset storage medium.

Use the access method to communicate with the digital asset storage medium. Use the location information to locate and retrieve the digital asset from the appropriate file and folder and present it to the user.

An important feature of the invention described herein is the generation of a unique medium identifier for each digital asset storage medium. This medium identifier is generated using a method that will always generate the same value for a particular digital asset storage medium, no matter how it is accessed. Generally, it will be desirable that the medium identifier can be generated by separate instances of a software application that can be run on different computing systems.

Figure 3:
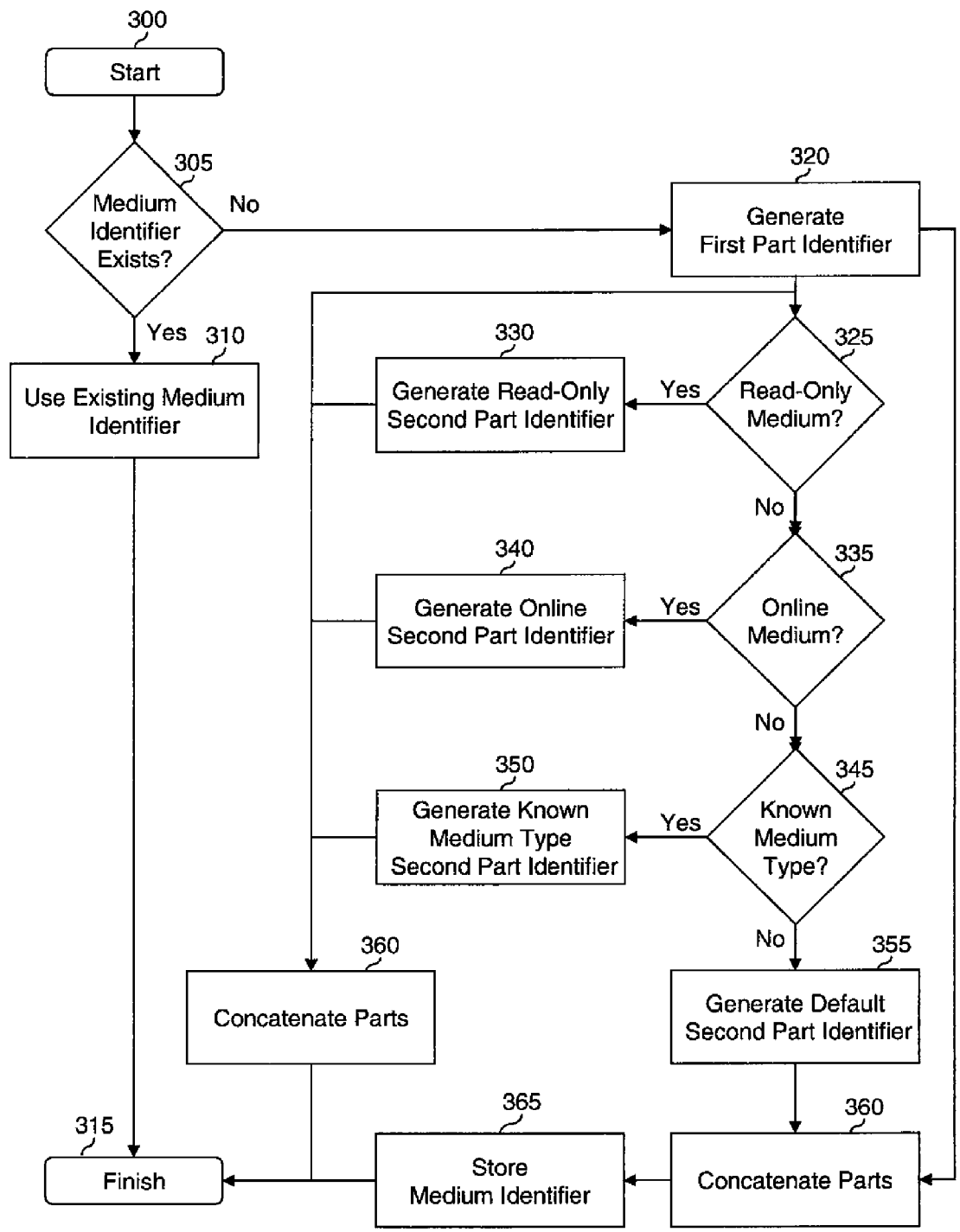
FIG. 3 is a flow diagram illustrating a method for creating a medium identifier for an asset storage medium.

A method for generating the medium identifier according to a preferred embodiment of the present invention is diagrammed in FIG. 3. The complete medium identifier is comprised of two parts that are calculated independently and then concatenated together into a single item called the medium identifier. The first part identifies the type of digital asset storage medium while the second part identifier distinguishes two different digital asset storage media of the same type.

Start step 300 of the medium identifier creation process is initiated when a new digital asset storage medium is detected. First, a medium identifier exists test 305 is applied to check whether a previously generated medium identifier has been stored on the digital asset storage medium. For certain types of digital asset storage media, if a medium identifier had been generated according to the present invention, the previously generated medium identifier would be stored in a predefined location or locations within the digital asset storage medium. It will take the form of an additional digital asset, where the content contains the medium identifier. Normally, the only time a previously generated medium identifier will exist within an asset storage area would be when store medium identifier step 365 has been executed when the digital asset storage medium had been detected at some prior time. In some cases, it may be possible to access the same digital asset storage medium via different network locations or via different network interfaces or protocols. In those cases, it's possible that one view of the asset storage location would apply the store medium identifier step 365 while another view would not. Any medium identifier stored on the digital asset storage medium will take precedence over any other type of medium identifier generation steps.

If a previously generated medium identifier is detected by the medium identifier exists test, flow proceeds to the use existing medium identifier step 310 which extracts the medium identifier value stored on the digital asset storage medium. Finally, finish step 315 returns the medium identifier to the digital asset tracking system.

Note that the medium exists test 305 should be used to checking whether an existing medium identifier is already stored on the digital asset storage media should be run even if digital asset storage media is read-only. This covers several edge case situations, including the one where the digital asset storage media might be accessible by different paths and with different access permissions, including one path with read-only access permissions and another path having read-write access permissions. For example, if a read-write path to a particular digital asset storage medium was available at some previous time, a medium identifier could exist on the digital asset storage medium, even if it is currently only available using a read-only path.

If no medium identifier is found to exist using the medium identifier exists test 305, a generate first part medium identifier step 320 is used to generate a first part medium identifier. The first part medium identifier is a representation of the type of digital asset storage medium. It consists of a fixed string of characters or a code that represents the asset storage type. For example, if the medium type is represented by character strings, they can consist of values such as "CD_R_", "CD_RW_", "HARDDRIVE_", "KODAKGALLERY_", "KODAKCAMERA_", "SD_CARD", "USB_DRIVE", or "UPNP_FRAME_" depending on the type of the digital asset storage medium. Alternately, binary codes can be assigned to each medium type instead of using string values and they would have the same meaning.

The method used to create the second part of the medium identifier, which is uniquely associated with the particular digital asset storage media, can vary for each different medium type defined in the first part identifier. The main differences in the creation method of the second part identifier are based on whether the digital asset storage medium is read-only or read-write, but there are some optimizations available for some particular read-write digital asset storage medium types. These differences reflect the fact that read-only digital asset storage media have a fixed set of digital assets which cannot be changed by software, whereas read-write digital asset storage media allow software to make changes to the digital assets stored therein.

A series of tests are used to determine the particular method that should be used to create the second part identifier. A read-only medium test 325 is used to determine whether the digital asset storage medium is of a read-only type. For read-only digital asset storage media, such as some types of optical disks, the method assumes that the data stored on the digital asset storage medium is forever unchanging. Therefore, for these types of digital asset storage media, a unique second part identifier can be calculated based on the data stored thereon. The exact algorithm used by generate read-only second part identifier step 330 to calculate the second part identifier will vary based on the type of media. Such algorithms may include, but are not limited to, any of the following:

- The second part identifier can consist of a checksum generated by adding all the sizes of all the digital assets stored in it.
- The second part identifier can be the size value reported by the asset storage area, if available.
- The second part identifier can be generated by hashing the actual data contained in all the digital assets stored on the digital asset storage medium. An advantage of this approach is that it is more accurate, but it is at the expense of larger processing time and data transfer bandwidth requirements.
- The second part identifier can be generated by hashing metadata associated with the digital assets, such as modification dates, filenames and lengths.
- The second part identifier can be based on a unique identifier, such as a serial number, associated with the digital asset storage medium.

The choice of which method to use to generate the second part identifier varies depending on the particular type of digital asset storage media (which is represented in the first part of the medium identifier). This decision will be made based on which pieces of data are readily available to the algorithm and the time to process the various pieces of data. For digital asset storage media that have the capability to store very large numbers of digital assets, or for those with slow access speeds, the time to process multiple files must be considered carefully. It will generally be desirable that any software algorithms used for generating the medium identifiers are versioned to enable future updates and provide support for backwards and forwards compatibility.

For read-write digital asset storage media (e.g., hard drives and remote online storage areas such as website repositories), it cannot be assumed that the data stored on the digital asset storage media is unchanging. Therefore, no calculations for read-write storage can take the data size, structure or contents into account when generating the second part identifier.

If the digital asset storage medium is not a read-only medium, an online medium test 335 is used to determine whether the digital asset storage medium is an online medium type. If an online medium is detected, generate online second part identifier step 340 is used to determine the second part identifier. For many types of online digital asset storage media, all that is required to uniquely identify the digital asset storage medium is a user identification string, such as a user ID or E-mail address. For example, for websites such as Kodak Gallery, an E-mail address is used to identify the particular digital asset storage medium associated with a particular user. For these types of digital asset storage media, the generate online second part identifier step 340 generates a representation of the public user account information (such as the user's E-mail address or their logon ID) and uses that the second part identifier. Other types of online digital asset storage medium can be identified with unique identifiers such as a URL.

If the digital asset storage medium is not a read-only or online medium, a known medium type test 345 is used to determine whether the digital asset storage medium is of a type that is known to have a unique identifier that is available through a software call. Many devices such as removable disk drives, digital cameras, digital video cameras, digital picture frames, and UPnP devices fall into this category. The unique identifier may be a serial number or some other value that is completely unique to that device. This identifier can be used by a generate known medium second part identifier step 350 to generate the second part identifier for the digital asset storage medium. In general, the unique identifier can be used directly as the second part identifier. The unique identifier must be available to the system without requiring administrative access to a user's computer. If a unique identifier is not accessible for a particular digital asset storage medium, then a generate default second part identifier step 355 is used to determine the second part identifier.

For all other types of digital asset storage media other than the special cases discussed above the generate default second part identifier step 355 is used to determine the second part identifier. Most read-write storage media will fall into this category. In this case, the second part identifier is created by generating a Globally Unique Identifier (GUID). There are a number of currently available software libraries that can be used to create GUID values. In a preferred embodiment of the present invention, the GUID feature in the Microsoft .NET runtime library is used by the generate default second part identifier step 355.

After the first part identifier and the second part identifier have been generated, a concatenate parts step 360 is used to concatenate the two parts to form the complete medium identifier.

For the case where the second part identifier was created using the generate default second part identifier step 355, a store medium identifier step 365 is used to create a digital asset containing the complete medium identifier and store it in a pre-defined location on the digital asset storage medium. As discussed above, when the digital asset tracking system detects a new digital asset storage medium, the medium identifier exists test 305 will be used to detect the presence of a previously generated medium identifier by detecting the presence of this particular digital asset. This ensures that the digital asset storage medium will be uniquely identified every time it is accessed.

Once a medium identifier has been detected or generated for a particular digital asset storage medium, it can then be used to differentiate one digital asset storage medium from another and to enable the retrieval of stored digital assets. If a digital asset storage medium is later moved, the medium identifier will not change, so only the method of accessing the stored digital assets will need to be updated and associated with the medium identifier in the digital asset storage medium database 100 (FIG. 2A). Once these changes are made, the digital assets stored on the digital asset storage medium can again be accessed with the same information as before.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

10 Reference asset storage medium
12 Digital asset
14 Determine reference medium identifier (ID) step
16 Reference medium identifier (ID)
18 Database
20 Determine reference asset identifier (ID) step
22 Reference asset identifier (ID)
24 Access method
26 Store digital asset renditions step
28 Cached storage area
30 Candidate asset storage medium
32 Digital asset
34 Determine candidate medium identifier (ID) step
36 Candidate medium identifier (ID)
40 Determine candidate asset identifier (ID) step
42 Candidate asset identifier (ID)
44 Access method
50 Compare candidate medium identifier (ID) to database step
52 Add candidate medium to database step
54 Compare candidate asset identifier (ID) to database step
56 Add digital assets to database step
58 Update access method step
100 Digital asset storage medium database
110 Digital asset storage medium record
120 Digital asset storage medium record
130 Digital asset storage medium record
140 Medium identifier field
150 Friendly name field
160 Access method field
200 Digital asset database
210 Digital asset record
220 Digital asset record
230 Digital asset record
240 Digital asset identifier field
250 Medium identifier field
260 Location information field
300 Start step
305 Medium identifier exists test
310 Use existing medium identifier step
315 Finish step
320 Generate first part identifier step
325 Read-only medium test
330 Generate read-only second part identifier
335 Online medium test
340 Generate online second part identifier
345 Known medium type test
350 Generate known medium type second part identifier
355 Generate default second part identifier
360 Concatenate parts step
365 Store medium identifier step

The invention claimed is:

1. A method for tracking digital assets stored on digital asset storage media comprising:
   detecting availability of a reference asset storage medium at a first time;
   determining a reference medium identifier that uniquely identifies the reference asset storage medium;
   storing an association between the reference medium identifier and the reference asset storage medium in a database in a persistent storage area accessible from a plurality of network nodes on a distributed network;
   enumerating digital assets stored on the reference asset storage medium;
   storing renditions of the enumerated digital assets in a cached storage area accessible from the plurality of network nodes to preserve access to the enumerated digital assets even when the reference asset storage medium is not connected to the distributed network;
   determining digital asset identifiers that uniquely identify each of the enumerated digital assets;
   storing an association between the digital asset identifiers, the reference medium identifier and the renditions of the digital assets in the database on the persistent storage area;
   at a second later time, detecting the availability of a candidate asset storage medium;
   determining a candidate medium identifier that uniquely identifies the candidate asset storage medium; and
   comparing the candidate medium identifier to the reference medium identifier stored in the database in the persistent storage area to determine whether the candidate asset storage medium is the same as the reference asset storage medium.

2. The method of claim 1 wherein the reference asset storage medium is a read-only storage medium.

3. The method of claim 2 wherein the read-only storage medium is an optical disk.

4. The method of claim 1 wherein the reference asset storage medium is a read-write storage medium.

5. The method of claim 4 wherein the read-write storage medium is a hard drive, a floppy disk, a solid state storage device or a read-write optical disk.

6. The method of claim 1 wherein the reference asset storage medium is a removable storage device.

7. The method of claim 6 wherein the removable storage device is a removable hard drive, a solid state storage device or a removable optical disk.

8. The method of claim 1 wherein the reference asset storage medium is a digital camera, a video camera, an electronic picture frame, a mobile phone or a digital audio storage device.

9. The method of claim 1 wherein the reference asset storage medium is a remotely accessible storage medium.

10. The method of claim 9 wherein the remotely accessible storage medium is a network connected server, a network accessible storage device or an interact location with a remotely accessible calling interface.

11. The method of claim 1 wherein the persistent storage area is on a network server.

12. The method of claim 1 wherein the reference asset storage medium is accessed on a first network node on the distributed network, and the candidate asset storage medium is accessed on a second network node on the distributed network.

13. The method of claim 1 further including storing an association between the candidate medium identifier and the candidate asset storage medium in the database on the persistent storage area when the candidate asset storage medium is determined to be different from any previously detected reference asset storage medium.

14. The method of claim 1 further including storing information about an access method for the reference asset storage medium in the database on the persistent storage area.

15. The method of claim 14 wherein the information about the access method includes information about a network location for the reference asset storage medium, information about communications protocols or information about calling interfaces required to communicate with the reference asset storage medium.

16. The method of claim 1 wherein the digital assets include digital image files, digital video files or digital audio files.

17. The method of claim 1 further including determining a candidate digital asset identifier for a candidate digital asset on the candidate asset storage medium at the second time and comparing the candidate digital asset identifier to the digital asset identifiers associated with the reference asset storage medium to determine whether the candidate digital asset is the same as a digital asset on the reference asset storage medium.

18. The method of claim 17 wherein information about a storage location for the digital asset on the reference asset storage medium is stored in the database on the persistent storage area and further including the step of updating the information about the storage location when it is determined that the candidate digital asset on the candidate asset storage medium is the same as the digital asset on the reference asset storage medium.

19. The method of claim 17 further including:
storing a rendition of the candidate digital asset in a cached storage area accessible from the plurality of network nodes to preserve access to the candidate digital asset even when the candidate asset storage medium is not connected to the distributed network; and storing an association between the candidate digital asset identifier, the candidate medium identifier and the rendition of the candidate digital asset in the database on the persistent storage area when it is determined that the candidate digital asset on the candidate asset storage medium is different than any known digital assets identified in the database.

20. The method of claim 1 wherein the medium identifiers are comprised of two parts, the first part being related to the type of the digital asset storage media and the second part uniquely associated with the particular digital asset storage media.

21. The method of claim 20 wherein the second part of the medium identifiers include a checksum value, a hash value, a device serial number, a user E-mail address, a user identifier or a Globally Unique Identifier value.

22. The method of claim 1 wherein the renditions of the enumerated digital assets are copies of the enumerated digital assets or are low-resolution renditions of the enumerated digital assets.

23. The method of claim 1 wherein the cached storage area is the reference asset storage area, the persistent storage area, a storage area on a network server, a storage area on an internet website, or a storage area on an edge node of the distributed network.

* * * * *